US009605740B2

(12) United States Patent
Povirk et al.

(10) Patent No.: US 9,605,740 B2
(45) Date of Patent: Mar. 28, 2017

(54) CONTROL OF AN ELECTRONIC LOCKING DIFFERENTIAL

(75) Inventors: Jacob M. Povirk, Franklin, MI (US); Brian J. Andonian, Plymouth, MI (US); Joseph J. Torres, Dearborn, MI (US); Kenneth G. Walega, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 1700 days.

(21) Appl. No.: 12/571,590

(22) Filed: Oct. 1, 2009

(65) Prior Publication Data
US 2011/0082634 A1  Apr. 7, 2011

(51) Int. Cl.
| F16H 48/20 | (2012.01) |
| B60K 17/344 | (2006.01) |
| B60K 23/04 | (2006.01) |
| F16H 48/30 | (2012.01) |
| F16H 48/08 | (2006.01) |
| F16H 48/24 | (2006.01) |

(52) U.S. Cl.
CPC .......... F16H 48/30 (2013.01); B60K 17/344 (2013.01); B60K 23/04 (2013.01); B60W 2510/0604 (2013.01); B60W 2510/0657 (2013.01); B60W 2520/10 (2013.01); B60W 2520/14 (2013.01); B60W 2520/26 (2013.01); B60W 2520/28 (2013.01); F16H 48/08 (2013.01); F16H 48/24 (2013.01); F16H 2048/204 (2013.01)

(58) Field of Classification Search
USPC .......... 701/50, 58, 69, 82, 89, 91; 180/6.64, 180/24.09, 197, 249, 235; 303/163
See application file for complete search history.

(56) References Cited

U.S. PATENT DOCUMENTS

| 4,671,373 | A | | 6/1987 | Sigl | |
| 5,597,215 | A | * | 1/1997 | Fischle et al. | 303/139 |
| 5,695,022 | A | * | 12/1997 | Zalewski et al. | 180/249 |
| 5,899,951 | A | * | 5/1999 | Babbel et al. | 701/67 |
| 6,009,969 | A | | 1/2000 | Salcher et al. | |
| 6,038,506 | A | | 3/2000 | Diekhans et al. | |
| 6,175,796 | B1 | * | 1/2001 | Ishikawa | 701/50 |
| 6,498,974 | B1 | | 12/2002 | Rodrigues et al. | |
| 6,584,398 | B1 | | 6/2003 | Erban | |
| 6,631,320 | B1 | | 10/2003 | Holt et al. | |
| 2004/0059494 | A1 | * | 3/2004 | Yoneda | 701/89 |
| 2006/0175113 | A1 | * | 8/2006 | Rodeghiero | 180/249 |
| 2007/0179699 | A1 | | 8/2007 | Kinsey | |
| 2007/0184929 | A1 | * | 8/2007 | Piyabongkarn et al. | 475/84 |
| 2007/0221425 | A1 | * | 9/2007 | Meissner et al. | 180/233 |
| 2007/0250236 | A1 | * | 10/2007 | Newberry et al. | 701/51 |
| 2008/0221771 | A1 | | 9/2008 | Olsson | |
| 2008/0255735 | A1 | * | 10/2008 | Marathe et al. | 701/50 |

FOREIGN PATENT DOCUMENTS

EP         1886864 A1 *  2/2008

* cited by examiner

Primary Examiner — Jerrah Edwards
Assistant Examiner — Charles J Han
(74) Attorney, Agent, or Firm — James Dottavio; MacMillan, Sobanski & Todd, LLC

(57) ABSTRACT

A method for controlling a locking differential of a motor vehicle includes locking the differential, if vehicle speed is less than a reference speed, and a wheel speed differential due to wheel slip is greater than a reference speed; and unlocking the differential and preventing its engagement, if vehicle speed is greater than the reference speed, and said wheel speed differential is less than a reference speed.

12 Claims, 4 Drawing Sheets

CONTROL OF AN ELECTRONIC LOCKING DIFFERENTIAL

BACKGROUND OF THE INVENTION

1. Field of the Invention

The invention relates generally to a differential mechanism, which transmits rotating power to the wheels of a motor vehicle.

2. Description of the Prior Art

An engaged electronic locking differential (ELD) mechanically couples a side gear to the differential case when actuated by an electromagnetic coil connected to a voltage source, which is controlled in some cases by a control module.

The driven wheels are the wheels that are coupled by the electronic locking differential. When activated the electronic locking differential prevents relative motion between the driven wheels and transmits engine combustion torque multiplied by the transmission and axle ratio to the wheels. With the electronic locking differential engaged, in most instances, the maximum axle input torque (AIT) is limited by the skid torque of the wheels on the surface having the highest coefficient of friction surface, the largest tire surface area and the highest gross weight vehicle.

When slip between the driven wheels occurs due to traction loss on a slippery surface, engagement of the electronic locking differential generates the maximum available traction force, whereas an open differential will generate a total traction force that is twice the force on the wheel having the lower coefficient of friction.

ELD functionality includes making changes between on/off states, engage/disengage states, or intermittent states that transfer a greater percentage of available torque to the driven wheel having the higher coefficient of friction, similar to a limited slip differential bias ratio.

On/off functionality of the ELD may be controlled manually, such as by changing the state of an actuator switch that is linked by a wiring harness to a control module.

A need exists in the motor vehicle industry for a control strategy that enables active or automatic control of the electronic locking differential functionality, thereby eliminating need for any manual actuation and electrical wiring that otherwise would be required to connect the actuator input and a controller.

SUMMARY OF THE INVENTION

A method for controlling a locking differential of a motor vehicle includes locking the differential, if vehicle speed is less than a reference speed, and a wheel speed differential due to wheel slip is greater than a reference speed; and unlocking the differential and preventing its engagement, if vehicle speed is greater than the reference speed, and said wheel speed differential is less than a reference speed.

The automatically controlled, electronically locking differential eliminates the need for a manually activated switch and the wiring between the switch and a controller, thereby avoiding cost and lowering the weight and complexity of the differential system.

Furthermore the automatically activated differential system appeals to a broader customer base, such as all-wheel-drive (AWD) vehicle operators as compared to 4×4 vehicle operators.

With its integration into the vehicle antilock brake system (ABS), active electronic control of the ELD is precise. Control strategies and algorithms can be developed to avoid many error states that are inherent in manually actuated differential systems, thereby improving quality, customer satisfaction and reducing warranty costs.

The control prevents the occurrence of error states including (i) engaging the differential when wheel speed differential is too high, which would otherwise cause an objectionable clunk; (ii) disengaging the differential when vehicle yaw rate is high, which could disrupt vehicle stability; and (iii) Inadvertent differential engagement at highway speed.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
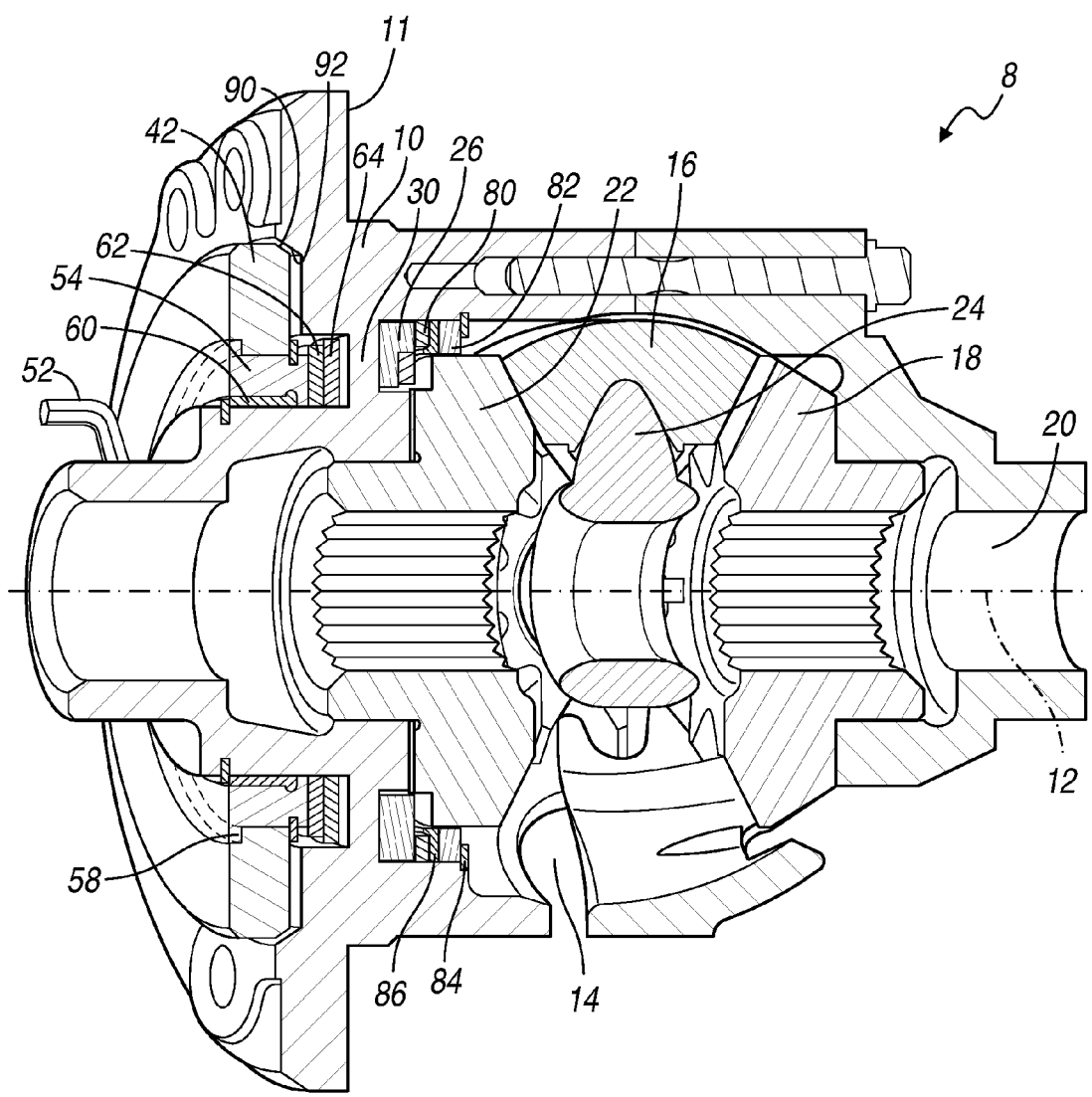
FIG. 1 is an isometric cross section of a differential mechanism according to the present invention.

Referring first to FIG. 1, a differential mechanism 8 includes a differential case 10, preferably of cast iron or steel, supported on a stationary housing (not shown) for rotation about a lateral axis 12. A bevel ring gear, secured to the case at the attachment bore holes on the flange 11, drives the case 10 in rotation about axis 12 from an output of a transmission or transfer case.

The case 10 provides an internal chamber 14, which contains bevel pinions 16, a right side gear 18 meshing with the pinions and driveably connected to a right output shaft 20, which extends from the case 10 to a driven wheel of a motor vehicle, and a left side gear 22 meshing with the pinions 16 and driveably connected to a left output shaft (not shown), which extends from the case to a driven wheel at the left side. The pinions 16 are each secured by pins 24 to the rotating case 10, such that the pinions 16 rotate about the axis of pins 24 perpendicular to axis 12, and the pinions 16 and pins 24 rotate about axis 12.

Figure 2:
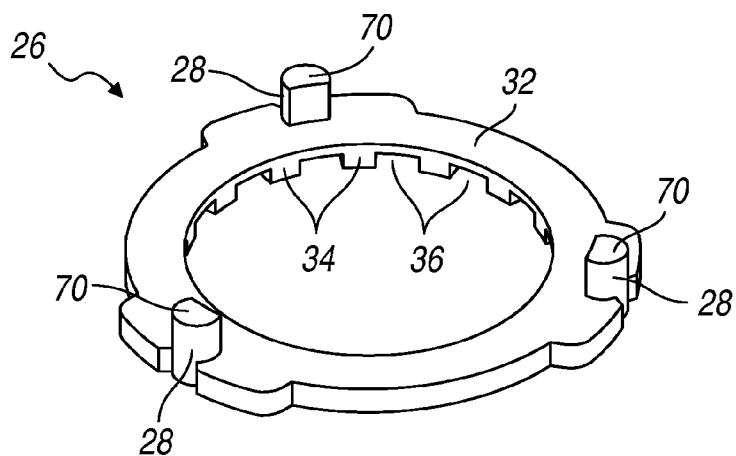
FIG. 2 is an isometric view of a locking ring.
Figure 3:
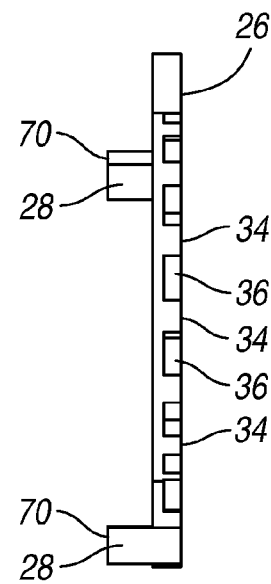
FIG. 3 is a side view of the locking ring of FIG. 2.
Figure 4:
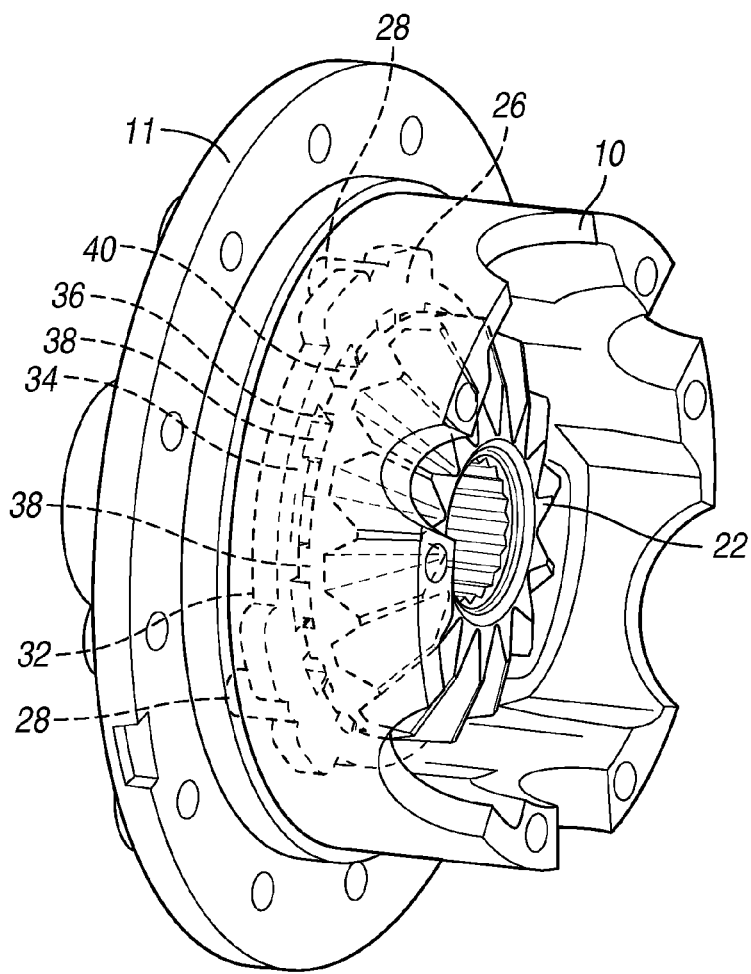
FIG. 4 is an isometric view of the case.

Also located in the case 10 is a locking ring 26, secured to the case such that it rotates about axis 12 and moves axially relative to the case along the axis. FIGS. 2, 3 and 4 show that ring 26 is formed with three posts 28, each post extending axially through a hole in web 30, which is formed in the case 10; a planar surface 32 facing the web 30; and a series of clutch teeth 34 and spaces 36 angularly arranged alternately about axis 12 on the axially opposite side of the locking ring from surface 32. The clutch teeth and spaces are adjacent and face the side gear 22.

FIG. 4 shows that side gear 22 is formed with a series of clutch teeth 38 and spaces 40 angularly arranged alternately about axis 12 on its axial outer face adjacent the clutch teeth 34 and spaces 36 of the locking ring 26. The clutch teeth and spaces of the side gear 22 and locking ring 26 are mutually complementary such that they can engage and disengage as the locking ring moves toward and away from the side gear. The locking ring 26 is normally not engaged with the side gear 22 and permits the side gear to rotate with respect to the differential case 10 and the locking ring, thereby producing an unlocked or disengaged state. When the locking ring 26 is actuated to engage the side gear 22, their clutch teeth and spaces mesh, thereby driveably connecting the side gear to the locking ring and case 10, preventing the side gear from rotating relative to the case and locking ring, and producing a locked or engaged state.

FIG. 1 shows a field core coil assembly 42 supported on the case 10 outside the chamber 14. The field assembly 42 includes an electromagnetic coil, which produces a magnetic field when energized with electric current. The field assembly is secured to the housing by brackets 52, which prevent the coil assembly 42 and its coil from rotating. The magnetic field produces an axial force on the coil assembly 42, whose magnitude varies with the width of an air gap between the coil assembly and the case 10.

When the coil assembly 42 is energized, it is attracted to the differential case due to the magnetic field generated by the coil. The coil assembly 42 is fixed against rotation with respect to the differential case 10, but it can translate axially toward and away from the differential case. Axial translation of the coil assembly 42 is transmitted to a sliding collar 54, which is secured to the coil assembly 42 by a press fit and an overlapping rim 58. A bushing 60, which is press fit onto the inside diameter of the sliding collar 54, allows rotation of the case with respect to the sliding collar 54 and coil assembly 42. The bushing 60 also provides a linear guide for the sliding collar 60 and coil assembly 42, allowing them to translate axially.

When the coil assembly 42 is energized, the sliding collar 54 applies an axial force directed rightward to a roller thrust bearing 62 and thrust plate or thrust washer 64. Bearing 62 and thrust plate 64 are located in an annular recess formed in the case. Thrust plate 64 applies axial force to the lock ring 26 through the posts 28 on the locking ring. The thrust plate 64 is annular. The posts 28 extend through the axial holes in web 30, causing the locking ring 26 to rotate with the case 10 and allowing the locking ring to move axially relative to the case. The post surfaces 70 are located at the left side of the web 30 adjacent the thrust plate lugs 68.

The locking ring 26 moves into mechanical engagement with the side gear 22 to prevent rotation of the side gear. Springs 80 and 82 are located adjacent to the locking ring 26 and are arranged in series such that spring 80 contacts and applies resilient force to the locking ring, and spring 82 is secured to the case 10 by a snap ring 84 and applies resilient force to spring 80. Preferably springs 80, 82 are wave springs having corrugations directed radially from axis 12 to their radial outer peripheries, the corrugations being formed with alternating radial ridges and grooves. The springs 80, 82 are separated by a flat plate 86, located axially between the springs, such that the ridges of each spring corrugation contact the plate, thereby preventing mutual contact of the springs. The springs continually apply resilient axial force directed leftward to the locking ring 26 to oppose movement of the locking ring toward the locked position with the side gear 22 in response to the magnetic force produced by the coil assembly 42. When the coil current is removed, the springs 80, 82 return the locking ring 26 to the disengaged position. The force applied by the springs is sufficient to prevent inadvertent locking of the differential during normal driving conditions when the coil is deenergized. Furthermore, spring 80 has a much lower spring rate than that of spring 82, such that a nonlinear spring force curve is generated. The spring arrangement ensures that the spring force is always lower than the force applied to the locking ring 26 by coil assembly 42 when energized. Since the force produced by the coil assembly 42 when energized is nonlinear, springs 80, 82 are selected so that the magnitude of the spring force applied to the locking ring 26 is less than the force applied by the coil assembly when energized.

A beveled surface 90 is formed near the outer diameter of the coil assembly 42, and parallel beveled surface 92 is formed on the differential case 10 adjacent the beveled surface on the coil assembly. When the coil is energized, there must be clearance between the coil and the differential case 10 so that the coil does not contact the rotating differential case. This clearance is established by the measurement between the differential case web and the thrust plate face in the engaged state. This clearance must be less than the clearance between the coil 42 and differential case 10 in the disengaged state.

To automatically control the on/off, i.e., engaged/disengaged function of differential mechanism 8, various vehicle sensors are used to produce an electronic signal representing wheel speed, engine torque, vehicle speed, steering wheel angle, engine throttle position and yaw acceleration of the vehicle, such as occurs when the vehicle is traveling in a curve or executing a turn. The control algorithm analytically predicts differential wheel speed due to a difference is frictional contact of one of the driven wheels with the road surface. The control engages the electronic locking differential 8 to increase frictional contact of the wheel.

Figure 5:
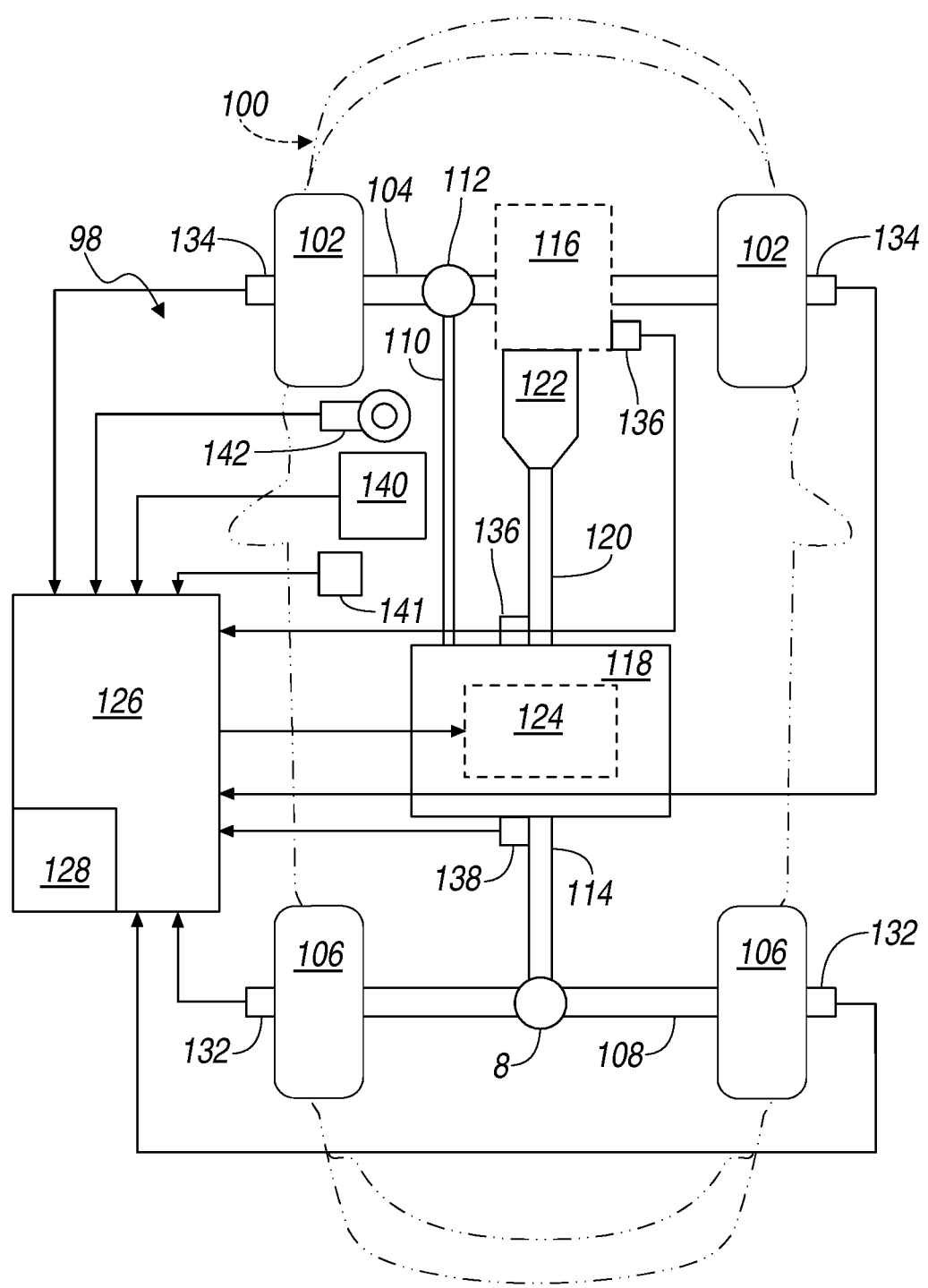
FIG. 5 is a schematic diagram of a motor vehicle powertrain showing sensor used to control a locking differential.

FIG. 5 shows sensors located in the powertrain 98 of motor vehicle 100. The powertrain includes a pair of front wheels 102, which are operatively mounted upon a front axle 104, and a pair of rear wheels 106, which are operatively mounted upon a rear axle 108. Front axle 104 is operatively coupled to and receives torque and power from a front driveshaft 110 through a front inter-wheel open differential 112. The rear axle 108 is operatively coupled to and receives torque and power from a rear driveshaft 114 through a rear, inter-wheel electronic locking differential 8.

Front and rear driveshafts 110, 114 selectively receive torque and power produced by the engine 116 through a transfer case 118. Torque and power produced by the engine 116 is delivered to transfer case 118 through an input shaft 120, which is coupled to a transmission 122. Rear driveshaft 114 is coupled to the transmission 122 and continuously receives torque from the input shaft 120. Transfer case 118 includes a conventional electromagnetic clutch assembly 124, which selectively transfers torque to the front driveshaft 110.

A conventional microcontroller 126 is accessible to electronic memory 128 and operates under stored program control. Controller 126 is electrically, physically and communicatively coupled to rear wheel speed sensors 132, front wheel speed sensors 134; engine throttle position sensor 136; vehicle speed sensor 138; yaw rate sensors 140; and vehicle lateral acceleration sensor 141, and steering wheel angle sensor 142. Controller 126 receives signals generated by the sensors, processes the received signals to determine from executing the control algorithm the desired state of differential mechanism 8.

Memory 128 is a conventional memory unit including both permanent and temporary memory, and stores at least a portion of the operating software which directs the operation of controller 126. Moreover, memory 128 is adapted to selectively store other types of data or information, including information associated with operation of vehicle 100.

As will be more fully discussed below, examples of such data include, but are not limited to, data relating to the speed of driveshafts 104, 108, the difference in the speed of the driveshafts, referred to as the "delta shaft speed", and engine operating data. Memory 128 also stores various mathematical constants and reference or threshold values, which are selectively utilized to calculate a control output signals, and present and past control signal output values and other potential output values. These values are preferably held within one or more matrixes or database tables which are stored within memory 128.

As should also be apparent to those of ordinary skill in the art, controller 126 and memory 128 may actually comprise several commercially available, conventional, and disparate chips or devices, which are operatively and communicatively linked in a cooperative manner.

Sensors 132, 134, 136, 138, 140 and 142 comprise conventional and commercially available sensors, which respectively measure the rotational speed, torque, and acceleration, and which respectively generate and communicate signals representing each of these measured values to controller 126. It should be appreciated that the sensors may include filtering and/or processing devices or circuits (e.g., low pass, high pass, and/or band pass filters) which filter and/or process the measured or sensed data prior to sending the data to controller 126.

Figure 6:
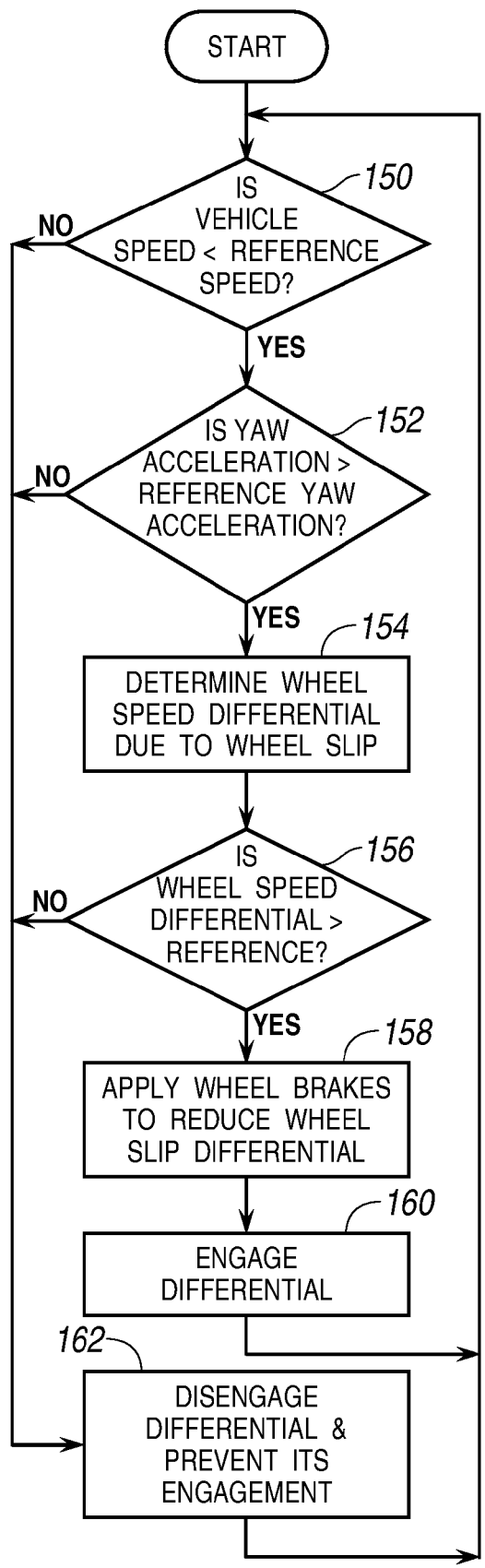
FIG. 6 is logic flow diagram of an algorithm for controlling the state of the locking differential.

FIG. 6 is logic diagram illustrating an algorithm that controls the state of the locking differential 8. At step 150 a test is made to determine whether vehicle speed (VS) is less than a reference VS, which is preferably about 30 mph.

If the result of test 150 is logically false, control advances to step 162 where differential 8 is disengaged and its engagement is prevented by controller 126 opening an electrical connection between coil 42 assembly and a source of electric power.

If the result of test 150 is logically true, at step 154 steering angle sensor 142 and yaw acceleration sensor 140 are used to determine if the vehicle 100 is turning or corning. If the yaw rate is greater than a reference yaw rate, control advances to step 162 where differential 8 is disengaged and its engagement is prevented. Step 152 may also include determining that (i) the steering wheel is displaced from a centered position greater than a reference displacement angle, and (ii) the lateral acceleration of the vehicle 100 is greater than a reference lateral vehicle acceleration, which is preferably about 0.1 g.

At step 154, controller 126 uses the four wheel speed sensors 132, 134 to determine the magnitude of wheel speed differential due to wheel slip. Step 154 may also include determining that (i) the steering wheel is displaced from a centered position less than a reference displacement angle, and (ii) the engine throttle position is greater than a reference throttle position. The steering wheel angle (SWA) that would be acceptable for the reference SWA is about 2 degrees. A range of engine throttle displacement that would be acceptable for the reference engine throttle displacement is light to moderate throttle. i.e., about 25 percent of the maximum throttle displacement range. A yaw rate that would be acceptable for the reference yaw acceleration is about 0.2 deg/sec.

At step 156 a test is made to determine whether the wheel speed differential due to wheel slip is greater than a reference wheel speed differential, which is preferably about 6 rpm. If the result of test 156 is logically false, indicating that wheel speed differential due to slip is low, control advances to step 162 where differential 8 is disengaged and its engagement is prevented.

If the result of test 156 is true, at step 158, controller 126 actuates the anti-lock brake system automatically to control the wheel speed differential due to wheel slip and engine combustion torque.

At step 160, controller 126 locks differential 8 by electrically connecting an electric power source to the field coil assembly 42.

In accordance with the provisions of the patent statutes, the preferred embodiment has been described. However, it should be noted that the alternate embodiments can be practiced otherwise than as specifically illustrated and described.

The invention claimed is:

1. A method for controlling a locking differential of a motor vehicle, comprising the steps of:
   (a) locking the differential, provided vehicle speed is less than a reference speed, yaw acceleration of the vehicle is greater than a reference yaw acceleration, and a wheel speed differential is greater than a reference wheel speed differential; and
   (b) unlocking the differential and preventing its engagement, provided vehicle speed is not less than the reference speed, or yaw acceleration of the vehicle is not greater than the reference yaw acceleration or the wheel speed differential is not greater than the reference wheel speed differential.

2. The method of claim 1, wherein step (b) further comprises unlocking the differential and preventing its engagement, provided that any of the conditions in step (b) are met, or that an angular displacement of a steering wheel from a centered position is less than a reference angle and lateral acceleration of the vehicle is less than a reference lateral acceleration.

3. The method of claim 1, wherein step (a) further comprises locking the differential, provided that the conditions of step (a) are met and that an angular displacement of a steering wheel from a centered position is greater than a reference angle, and that lateral acceleration of the vehicle is greater than a reference lateral acceleration.

4. The method of claim 1, wherein step (a) further comprises determining that an angular displacement of a steering wheel from a centered position is less than a reference angle and an engine throttle displacement is greater than a reference displacement.

5. The method of claim 1, wherein step (a) further comprises automatically applying wheel brakes if the wheel speed differential is greater than the reference wheel speed differential.

6. The method of claim 2, wherein the reference angle is about 2 degrees, and the reference lateral acceleration is about 0.1 g.

7. The method of claim 4, wherein the reference angle is about 2 degrees, and the reference displacement of the engine throttle is about 25 percent.

8. A method for controlling a locking differential of a motor vehicle, comprising the steps of:
   (a) locking the differential, provided yaw acceleration of the vehicle is greater than a reference yaw acceleration and a wheel speed differential is greater than a reference wheel speed differential; and
   (b) unlocking the differential and preventing its engagement, provided vehicle speed is not less than a reference speed, or yaw acceleration of the vehicle is not greater than the reference yaw acceleration or a wheel speed differential is not greater than the reference wheel speed differential.

9. The method of claim 8, wherein step (b) further comprises unlocking the differential and preventing its engagement, provided that any of the conditions in step (b) are met, or that an angular displacement of a steering wheel from a centered position is less than a reference angle and lateral acceleration of the vehicle is less than a reference lateral acceleration.

10. The method of claim 8, wherein step (a) further comprises locking the differential, provided that the conditions of step (a) are met and that an angular displacement of a steering wheel from a centered position is greater than a reference angle, and that lateral acceleration of the vehicle is greater than a reference lateral acceleration.

11. The method of claim 8, wherein step (a) further comprises automatically applying wheel brakes if the wheel speed differential is greater than the reference wheel speed differential.

12. The method of claim 8, wherein step (a) further comprises determining that an angular displacement of a steering wheel from a centered position is less than a reference angle and an engine throttle displacement is greater than a reference displacement.

* * * * *